UNITED STATES PATENT OFFICE.

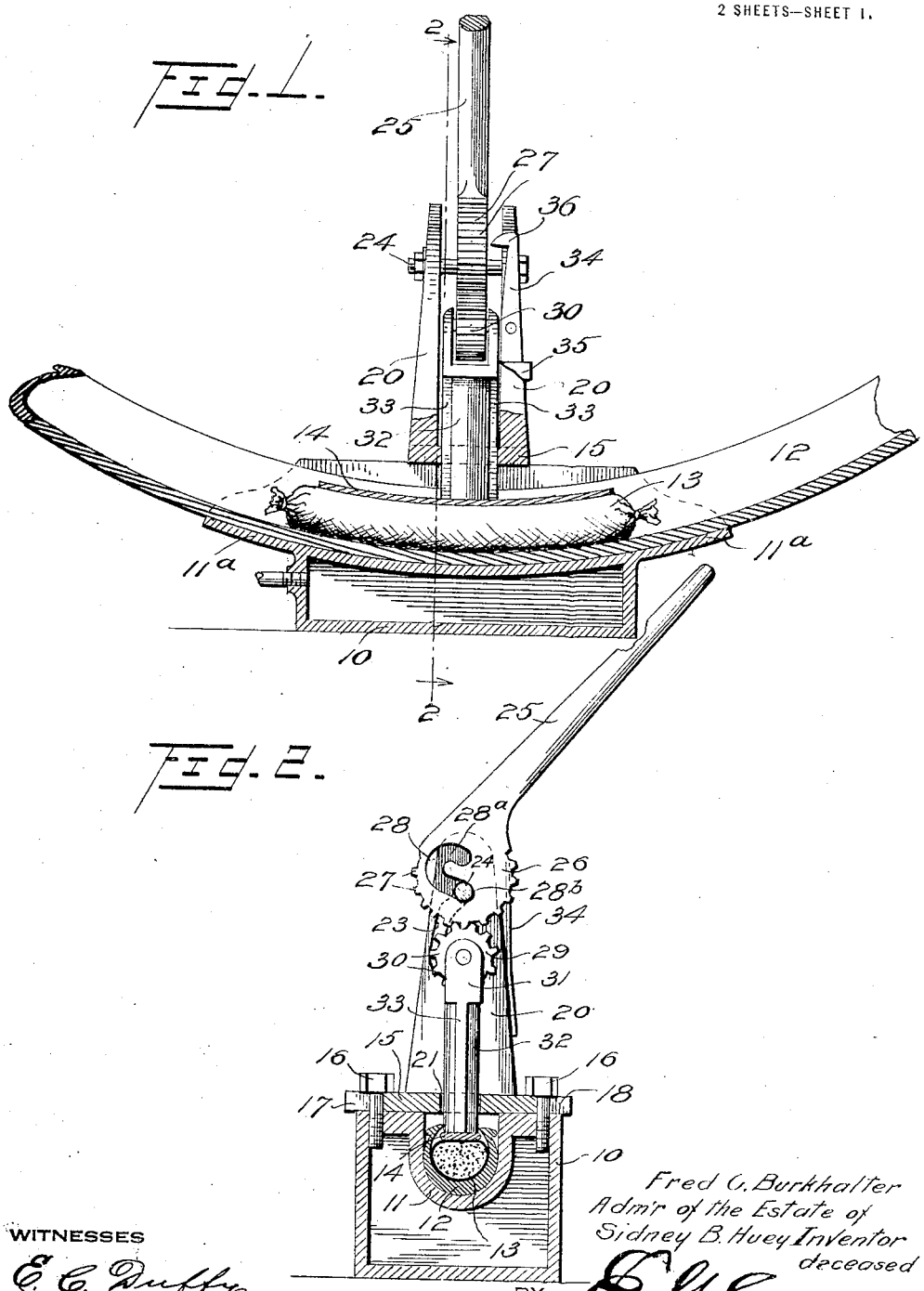

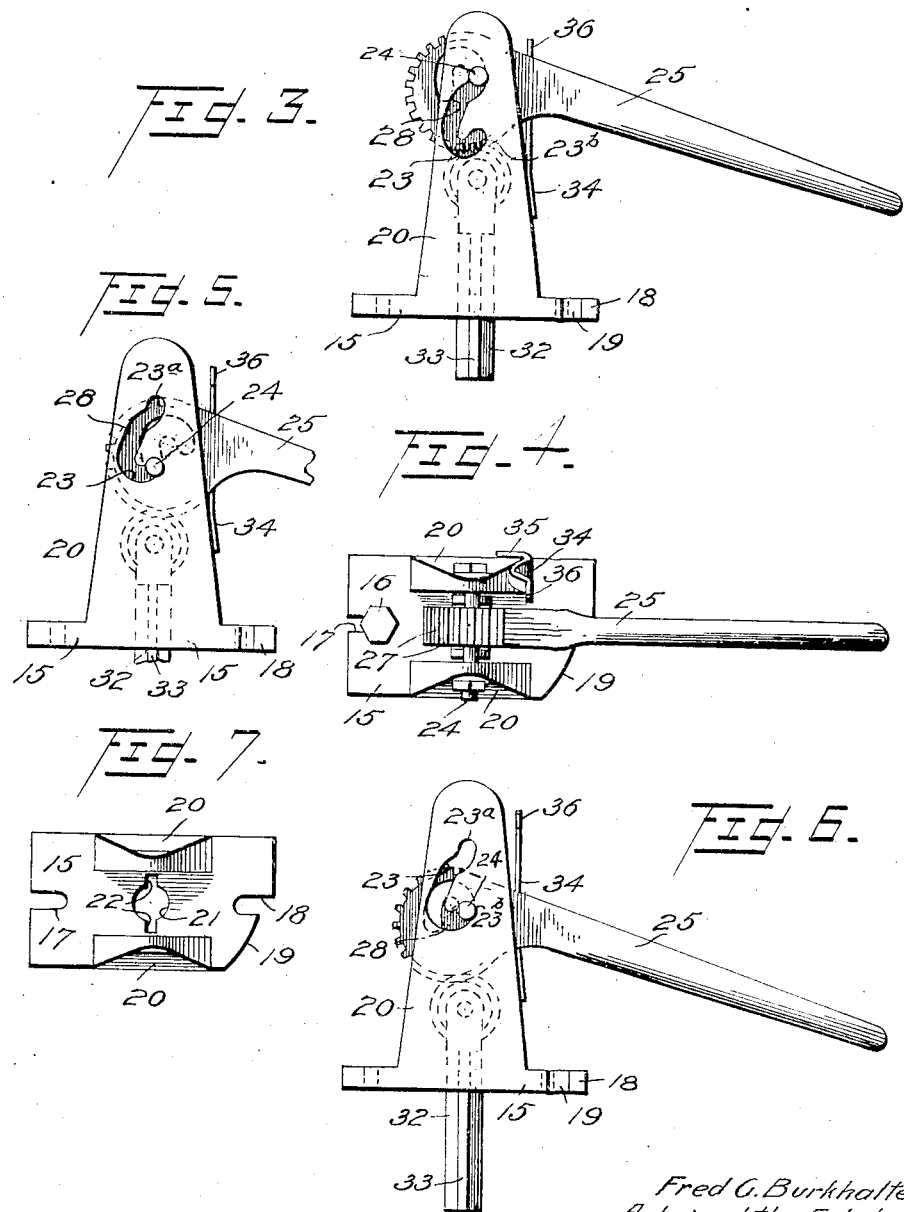

SIDNEY B. HUEY, DECEASED, LATE OF WICHITA, KANSAS, BY FRED C. BURKHALTER, ADMINISTRATOR, OF WICHITA, KANSAS.

PRESSURE-CLAMP FOR VULCANIZING APPARATUS.

1,354,754.   Specification of Letters Patent.   Patented Oct. 5, 1920.

Application filed February 11, 1920. Serial No. 357,796.

*To all whom it may concern:*

Be it known that I, FRED C. BURKHALTER, a citizen of the United States, residing at Wichita, county of Sedgwick, State of Kansas, administrator of SIDNEY B. HUEY, late a citizen of the United States, and a resident of Wichita, in the county of Sedgwick and State of Kansas, deceased, (as by reference to the duly-certified copy of letters of administration hereto annexed will more fully appear,) do hereby declare that the said SIDNEY B. HUEY, invented a new and useful Improvement in Pressure-Clamps for Vulcanizing Apparatus, of which the following is a specification.

This invention relates to clamps for exerting varying degrees of pressure on objects.

An object of the invention is to provide a pressure clamp which may be used in connection with any vulcanizing machine to apply a variable pressure to the article vulcanized.

Another object is to provide a pressure clamp particularly adapted for use with tire repair, retreading and rebuilding apparatus, in which pressure must be applied gradually as the heat is started to cause the rubber to flow onto the surface of the tire.

A further object is to provide a clamp which will be useful in vulcanizing or otherwise repairing all sizes of tires, particularly of the pneumatic type.

The invention may be regarded as an attachment for vulcanizing machines, and comprises a base, a pair of standards, a pressure lever pivotally mounted between the standards, and a reciprocable pressure foot or plunger, also mounted between the standards, movable by means of the lever and guided in such movement by the base. The pressure lever has a cam head provided with gear teeth meshing with a pinion which is mounted to turn freely upon the upper end of the plunger. Slots are provided in the standards in which the pivotal element for the lever may be shifted. The lever has a slot in its head so that its position with respect to the pivotal element may also be shifted.

The invention will be best understood from a consideration of the following detailed description taken in connection with the accompanying drawings forming a part of this specification, with the understanding, however, that the invention is not confined to any strict conformity with the showing in the drawings, but may be changed and modified so long as such changes and modifications mark no material departure from the salient features of the invention as expressed in the appended claims.

In the drawings,

Figure 1 is a sectional elevation of the invention shown applied to a conventional type of tire vulcanizing apparatus, with a segment of a tire shown in place.

Fig. 2 is a section on the line 2—2 of Fig. 1.

Fig. 3 is a side elevation of the pressure clamp alone, showing a position of the parts different from that illustrated in Fig. 2.

Fig. 4 is a top plan view of the pressure clamp.

Fig. 5 is an elevation of the pressure clamp, showing a third position of the parts.

Fig. 6 is an elevation of the pressure clamp, showing a fourth position of the parts.

Fig. 7 is a top plan view of the base or frame of the pressure clamp.

The numeral 10 represents the heating compartment of a conventional type of tire repairing apparatus comprising a box-like structure with rectangular walls closed at the top by a tire receiving and seating cover 11. The cover 11 is preferably made integral with the heating box and has ends extending beyond the confine of said box, as shown at 11ª, whereby a tire 12 is supported securely in the seat provided by said cover.

In the ordinary process of repairing tire casings, a sand-bag 13 is employed, and an elongated curved plate 14 is placed upon the sand-bag, while a clamping means is provided to press upon the curved plate 14 to transmit pressure through the sand-bag to the casing. In the past it has been customary to use ordinary screw clamps to exert the necessary pressure upon the sand-bag and tire during the vulcanizing process. A number of these clamps are provided and each one must be turned to exert the necessary pressure. This requires considerable time and trouble. In order to obviate the tedious turning of a number of screw clamps, I have provided a pressure clamp for vulcanizing apparatus which forms the subject of the present invention.

My improved pressure clamp includes a base 15, which, as shown in Fig. 2, is held by stud bolts 16 in place upon the upper side of the vulcanizing apparatus. As Fig. 7 illustrates, the base 15 is provided with slots 17, 18 at either end, which slots are adapted to receive the stud bolts referred to. A portion of the base is cut away, as shown at 19, so that the base may be pivotally swung about one stud bolt as an axis to bring the other stud bolt into or out of the slot 18.

Spaced standards 20 are formed integrally with the base and may be of any desirable form. A bore 21 is also provided on the base, between the standards. Keyways or slots 22 lead off from diametrically opposite points of the bore 21 for a purpose to be described.

Each of the standards 20 is provided with a curved slot 23. The slots in the standards match each other. These slots are so formed as to provide an upper seat $23^a$ and a lower seat $23^b$, these two seats being in vertical alinement with each other and being connected by the slot which curves downwardly from the seat $23^b$ and then upwardly to the seat $23^a$. The disposition of the slots 23 is such that while the seats $23^a$ and $23^b$ lie in the longitudinal axis of the standard 20, the remainder of the slot lies wholly to one side of said axis. The slots 23 are preferably located above the mid-point of the standards but nearer the mid-point than the upper end thereof. The vertical position of the slots 23 is not of importance, however, for a different position of the slots may be desirable with an arrangement of the parts different from that depicted in the drawings.

A pivotal element is provided, preferably a bolt, which is fitted into the slots 23 in the spaced standards and which is shiftable along said slots for a purpose to be explained. The bolt 24 is a pivot or axis for a pressure lever 25 comprising a handle and a cam head 26, the peripheral portion of which has gear teeth 27. A slot 28 is provided in the head 26, which slot is arcuate and has a radius of curvature smaller than the radius of curvature of the cam head. This slot is located near the periphery of the cam head and on that side of the cam head remote from where it is joined to the handle. Slot 28 provides means whereby the pressure lever may be shifted with respect to the pivotal element, thus making it possible to increase or decrease the leverage with which the lever operates. The ends $28^a$ and $28^b$ of the slot 28 provide seats in either of which the bolt 24 fits when the pressure lever is in working position. When the lever 25 turns about the bolt 24 seated in the end $28^b$ of the slot, there will be a small cam effect of the lever when swung downwardly because of the fact that the axis of movement is near the edge of the head 26.

When the lever is shifted so that the fulcrum is at the seat $28^a$, the center of movement is remote from the working face of the head 26, and consequently any movement of the pressure lever brings about considerable movement in the parts with which it is connected.

The gear teeth 27 of the pressure lever mesh with corresponding teeth 30 of a pinion 29 mounted to revolve freely between bifurcated ends 31 of a pressure foot or plunger 32. The pressure foot comprises a cylindrical member provided with guiding keys 33 running longitudinally therewith. The bore 21 of the base is of a size to receive the pressure foot 32 and allow free vertical sliding movement thereof with the keys 33 fitting into the key-ways 22.

A latch 34 of any convenient form is provided upon either of the standards 20 upon one edge thereof so as to swing in a substantially vertical plane. As shown in Fig. 1, the latch may comprise a flat sheet metal piece having a bent-over end 35 engaging with the wall of the standard to which it is pivoted to prevent movement of the latch in one direction and to provide a means whereby the latch may be handled. The upper end of the latch has a hook end 36 adapted to engage with the pressure lever 25 when the latter is in such a position as illustrated in Fig. 3.

In the process of repairing a tire, the casing will be placed upon the vulcanizing apparatus and the sand-bag will be seated within the casing as shown in Figs. 1 and 2, with a curved plate on top thereof. The pressure clamp will be applied so that the lower end of the pressure foot bears directly upon the curved plate, transmitting the pressure through the sand-bag to the casing. It becomes necessary in this process to apply varying pressure as the temperature of the rubber rises, and with the pressure clamp, which forms the subject of the present invention, this is readily done. The position of the parts in which less pressure is exerted is that shown in Fig. 2, where the pivotal element 24 is shown in the high position in the slots 23 of the standards and in which the pressure lever is movable about a fulcrum located in the end $28^b$ of its slot. When the lever 25 is pulled downwardly the gear teeth 27 will turn the pinion 29 and the eccentricity of the pivotal element 24 with respect to the cam head 26 will cause downward movement of the pressure foot. This eccentricity varying according to the position of the pivotal element 24 with respect to the cam head 26 will cause downward movement of the pressure foot. This eccentricity varies according to the position of the pivotal element 24 in the slot 28. If the lever swings about a fulcrum located at $28^b$ there will be a small movement of the pressure foot for a comparatively large movement of the lever. If the fulcrum of the lever is located in the end 28ª of the slot a comparatively small swing of the lever will bring about a considerable movement of the pressure foot.

Fig. 2 illustrates the lever in what may be called the high position with respect to the base and the position of small movement with respect to the pressure foot. Fig. 3 illustrates the pressure clamp with its lever in the position of rapid movement and in the high position with respect to the base. Fig. 5 shows a third position of the parts of the clamp, namely, the low position with respect to the base and the position of small movement. Fig. 6 represents the extreme of the clamping action with the pivotal element in the low position with respect to the base and the lever in the position of greatest clamping effect. Thus it is seen that the drawing depicts four possible positions of the parts. For each of the two positions of the pivotal element along the slot 23 there are two possible positions of the lever as it swings about said pivotal element; the position of rapid movement, or of great clamping effect and the position of small movement, or of little clamping effect.

The latch 34 will engage with the pressure lever to hold the same in clamping position only when the lever turns about the pivotal element seated at 23ª. With the pivotal element in the lower ends of slots 23, the parts will be self-locking and the latch, as shown in Fig. 6, does not engage the lever.

What is claimed is:—

1. A pressure clamp comprising a support, a pressure foot movable upon and guided by said support, a cam lever pivoted upon said support and engaging with said pressure foot to move the same into clamping position, said cam member having means whereby its fulcrum may be shifted to effect a change in leverage.

2. A pressure clamp comprising a support, a pressure foot movable upon and guided by said support, a cam lever pivoted upon said support engaging with said pressure foot to move the same into clamping position, said cam lever having a curved slot whereby its fulcrum may be shifted to effect a change in leverage.

3. A pressure clamp comprising a support, a pressure foot movable upon and guided by said support, a cam lever pivoted upon said support and engaging with said pressure foot to move the same into clamping position, and means whereby the pivotal element may be shifted toward and from the work.

4. A pressure clamp comprising a support, a pressure foot movable upon and guided by said support, a cam lever pivoted upon said support and engaging with said pressure foot to move the same into clamping position, said cam lever having means whereby its fulcrum may be shifted to effect a change in leverage, and means whereby the pivotal element may be shifted toward and from the work.

5. A pressure clamp comprising a support, a pressure foot movable upon and guided by said support, a cam lever pivoted upon said support and engaging with said pressure foot to move the same into clamping position, said cam lever having a curved slot whereby its fulcrum may be shifted to effect a change in leverage, and curved slots provided in the support whereby the pivotal element may be shifted toward and from the work.

6. A pressure clamp comprising a support, a hand lever, a pressure foot moved by the hand lever and guided by the support, said lever having means whereby its fulcrum may be shifted, said support having means whereby the element upon which the lever turns may be shifted.

7. A pressure clamp comprising a support, a pressure foot, a lever connected with the pressure foot, said lever turning about a pivotal element to cause clamping pressure of said foot, said pivotal element being shiftable along said support toward or from the work, said lever being shiftable with respect to the pivotal element whereby the lever may assume two positions with respect to said pivotal element and said pivotal element may assume two positions with respect to the work.

8. A pressure clamp comprising a support, a pressure foot movable upon and guided by said support, a cam lever pivoted upon said support and engaging with said pressure foot to move the same into clamping position, means whereby the pivotal element may be shifted toward or from the work, and means for holding the lever in clamping position when the pivotal element is in that position most remote from the work.

9. A pressure clamp comprising a support, a pressure foot movable upon and guided by said support, a cam lever pivoted upon said support and engaging the said pressure foot to move the same into clamping position, said cam lever having means whereby its fulcrum may be shifted to effect a change in leverage, means whereby the pivotal element may be shifted toward and from the work, and means to hold the lever in clamping position when the pivotal element is in that position most remote from the work.

10. A pressure clamp comprising a support, a pressure foot movable upon and guided by said support, a cam lever pivoted upon said support and engaging with said pressure foot to move the same into clamping position, means whereby the pivotal element may be shifted toward and from the work, means whereby the fulcrum of the lever may be shifted to effect a change in leverage, and a latch for the lever to hold the same in clamping position when the pivotal element is in that position most remote from the work whatever the position of the lever fulcrum with respect to the lever.

11. In a pressure clamp, a support, a hand lever having a cam head, said cam head having peripherally arranged gear teeth, and a pressure foot slidably mounted upon the support and provided with a pinion at one end, said pinion meshing with said gear teeth.

12. In a pressure clamp, a support, a hand lever provided with a cam head pivotally mounted upon said support, said cam head having gear teeth, a pressure foot slidably mounted upon the support and provided with a pinion at one end, said pinion meshing with said gear teeth, and means whereby the position of the pivotal element with respect to the work may be shifted.

13. In a pressure clamp, a support having standards, a lever having a cam head mounted upon a pivotal element secured to said standards, said cam head having gear teeth, a pressure foot having a pinion meshing with said gear teeth, the said standards having matching slots receiving said pivotal element whereby the same may be shifted longitudinally of the standards.

14. In a pressure clamp, a support, a lever having a cam head mounted upon a pivot provided on said support, said cam head having gear teeth, a pressure foot guided by said support and having a pinion meshing with said gear teeth, said cam head having a slot receiving said pivotal element whereby the fulcrum of said lever may be shifted.

15. In a pressure clamp, a support, said support having spaced standards, a lever having a cam head pivotally mounted between said standards, said cam head having gear teeth, a pressure foot having a pinion meshing with said gear teeth, means provided in said cam head whereby the fulcrum of the lever may be shifted, and means provided on said standards whereby the position of the pivotal element of the lever may be shifted.

16. In a pressure clamp, a support, said support being provided with spaced standards, a lever having a pivotal element mounted between said standards, said lever also having a cam head, the cam head being provided with peripherally arranged gear teeth, a pressure foot slidably mounted upon said support and provided with a pinion at its upper end, said pinion meshing with the gear teeth of the cam head, said standards having matching slots whereby the position of the pivotal element may be shifted, said cam head having a slot whereby the fulcrum of the lever may be shifted.

17. In a pressure clamp, a support, a pressure foot slidably mounted upon said support, a lever pivotally mounted upon said support and engageable with the pressure foot to move the same into clamping position, said lever having a cam head, the cam head being provided with an arcuate slot, the slot having a radius of curvature considerably less than the radius of curvature of the cam head, the slot being located near the periphery of the said cam head and on that side of the cam head remote from the point where it joins with the handle portion of the lever.

18. A pressure clamp comprising a base, spaced standards formed integrally with the base, said standards having matching slots, said slots lying to one side of the longitudinal axes of the standards and having seats at their ends in vertical alinement with each other and with said axes, a pivotal element adjustable along said slots, a lever mounted upon said pivotal element, and a pressure foot mounted to slide upon said support, said pressure foot being actuated by said lever.

19. A pressure clamp comprising a support, said support having spaced standards, a pressure foot slidably mounted with respect to the support between said standards, a lever also mounted between said standards to swing about a pivotal element joined thereto, said lever having a cam head in engagement with the pressure foot to cause longitudinal movement of the latter when the lever is swung about its pivot, said standards having matching slots receiving said pivotal element, said slots lying to one side of the longitudinal axes of the standards and having seats at their ends in vertical alinement with each other, said cam head having an arcuate slot receiving the pivotal element, said slot being of a radius of curvature less than that of the cam head.

20. A pressure clamp comprising a base, a pair of spaced standards, a pivotal element connected between said standards, a lever mounted upon said pivotal element between said standards and having a cam head, said cam head being provided with peripheral gear teeth, an arcuate slot also provided in the cam head near the periphery thereof, a pressure foot mounted to slide between the standards, said pressure foot having a pinion at its upper end meshing with said gear teeth, said standards having matching slots receiving the pivotal element and permitting adjustability of same, said matching slots each being provided with seats in vertical alinement.

21. A pressure clamp comprising a base, a pair of spaced standards, a pivotal element connected between said standards, a lever mounted upon said pivotal element between said standards and having a cam head, said cam head being provided with peripheral gear teeth, an arcuate slot also provided in the cam head near the periphery thereof, a pressure foot mounted to slide between the standards, said pressure foot having a pinion at its upper end meshing with said gear teeth, said standards having matching slots receiving the pivotal element and permitting adjustability of the same toward and from the work, said second-named slots each being provided with seats in vertical alinement, and a latch provided upon one of the standards for engaging with the lever when its pivotal element is in a position remote from the work.

22. In a pressure clamp, a pressure foot slidably mounted on a base, and means engaging with the pressure foot in either of two positions whereby either small or rapid movement of said pressure foot may be effected by the same actuating movement of the parts.

23. In a pressure clamp, a support, a pressure foot and a lever movable relatively to the support, latch means for the lever mounted on said support, and a pivotal element for the lever adjustable on said support in either of two positions, said lever itself being shiftable into two positions with respect to said pivotal element, the latch means holding the lever when shifted in either position and when turnable about the pivotal element in but one position.

24. In a pressure clamp, a support, a pressure foot and a lever movable relatively to the support, latch means for the lever mounted on said support, and a pivotal element for the lever adjustable on said support in either of two positions, said lever itself being shiftable into two positions with respect to said pivotal element, the latch means holding the lever when shifted in either position and when turnable about the pivotal element in but one position, the parts being self-locking when the pivotal element is in its other position.

25. In a pressure clamp, a base of substantially rectangular form, said base having slots at both of its ends, a pair of standards formed integrally therewith rising therefrom in spaced relation, a bore provided in the base between the standards, said bore having offset key-ways, said base having a portion of one end cut away, said cut-away portion intersecting with one of said slots, a pressure foot received by said bore, said pressure foot having keys fitted into said key-ways, and means for moving the pressure foot into clamping position.

In testimony that I claim the foregoing as the invention of SIDNEY B. HUEY, I have hereto affixed my signature in the presence of two witnesses.

FRED C. BURKHALTER,
*Administrator of Sidney B. Huey, deceased.*

Witnesses:
E. H. FISH,
W. D. TAYLOR.